Figure 1:
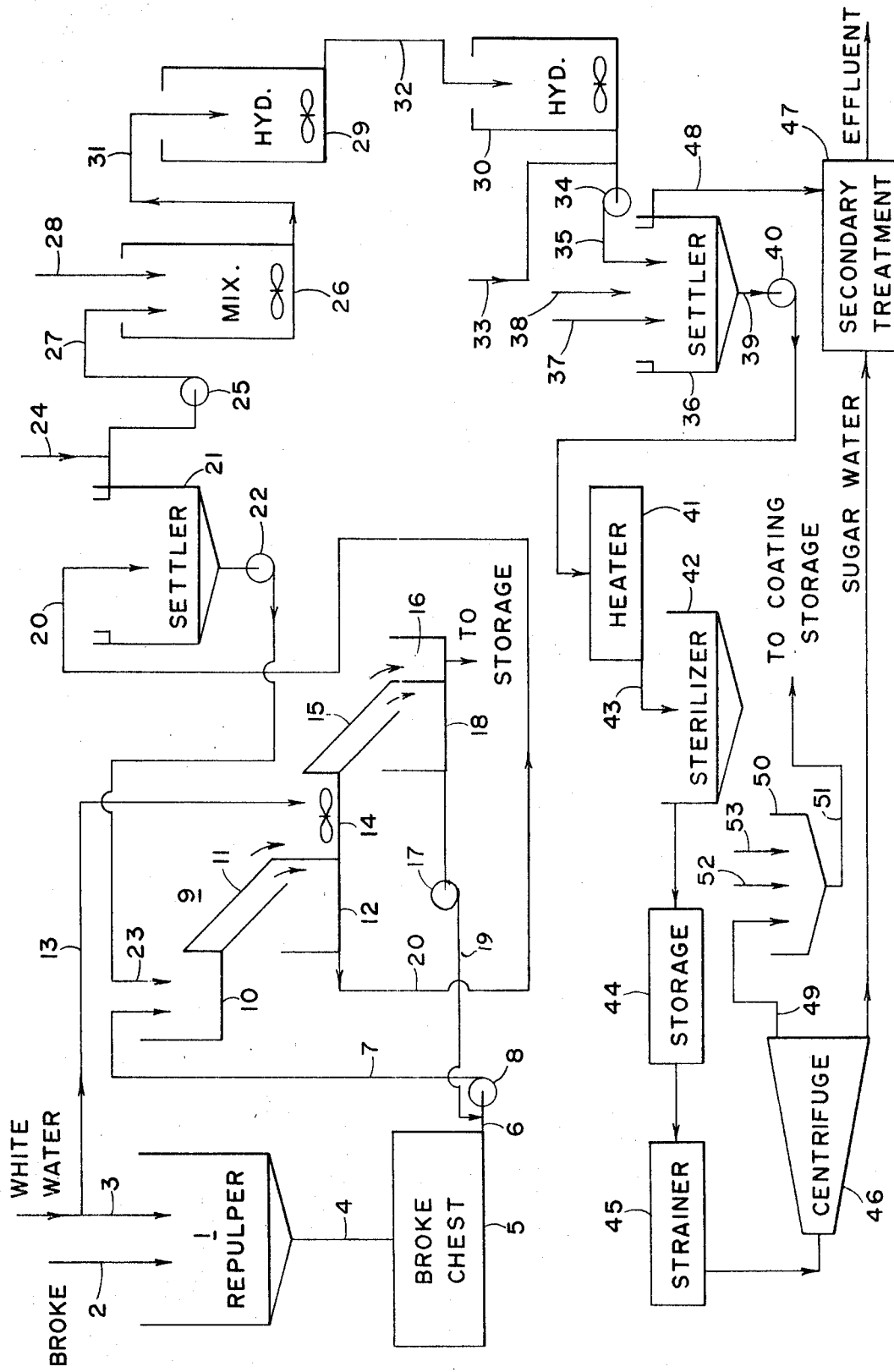

United States Patent
de Vos

[15] 3,652,383
[45] Mar. 28, 1972

[54] TREATMENT OF PAPER COATING WASTES CONTAINING STARCH AND PIGMENT

[72] Inventor: John Wallace de Vos, Appleton, Wis.

[73] Assignee: Kimberly-Clark Corporation, Neenah, Wis.

[22] Filed: Mar. 27, 1968

[21] Appl. No.: 716,432

[52] U.S. Cl. .................................................162/4, 162/5
[51] Int. Cl. .....................D21b 1/08, D21b 1/32, D21c 5/02
[58] Field of Search ....................................162/5, 4

[56] References Cited

UNITED STATES PATENTS

| 1,982,129 | 11/1934 | Wells et al. | 162/5 X |
| 3,047,452 | 7/1962 | de Vos | 162/5 |
| 2,916,412 | 12/1959 | Altmann et al. | 162/4 |
| 3,016,323 | 1/1962 | Altmann et al. | 162/4 |

FOREIGN PATENTS OR APPLICATIONS 287,884  11/1915  Germany ...................................162/5

Primary Examiner—Howard R. Caine
Attorney—Paul J. Glaister, Keith T. Bleuer, Daniel J. Hanlon, Jr. and Raymond J. Miller

[57] ABSTRACT

The separation of starch-containing coated paper broke or coating waste material into reusable pigment and fiber constituents together with an effluent which is subject to disposal in a manner to minimize or eliminate pollution problems. The pigment is recoverable from the coating composition waste material or coated paper broke aqueous suspension by utilizing the starch in sol form to maintain the pigment dispersed while effecting removal of other constituents, in the case of broke removal of fiber fines, for example. Subsequently, the starch is hydrolyzed and the dispersion treated to provide for pigment sedimentation and removal. The procedure is particularly beneficial in that there need be no effluent of the process which is not readily disposable by conventional means and without contamination or pollution of streams which may receive the final effluent.

8 Claims, 2 Drawing Figures

3,652,383

TREATMENT OF PAPER COATING WASTES CONTAINING STARCH AND PIGMENT

BACKGROUND OF THE INVENTION

Field of the Invention

This invention relates to a procedure which provides for recovering pigment separately from other constituents of coated paper broke or from coating waste materials. The pigment may be a single pigment type or a plurality of different pigments and is of that class commonly termed paper coating pigments having an opacifying function.

In the manufacture of paper, normal production procedures result in the making of recoverable reject material commonly termed "broke." Also, in coated paper manufacture normal operations result in some necessity for recovering or disposing of coating compositions which are washed from equipment, are left over at the end of a manufacturing run, or the like. It is desirable to recover from coated paper broke the fibers of the paper and, in many instances, it is desirable both to recover the pigment separately from the fibers and to provide a disposable process effluent. Additionally, it is generally desirable to separate out the pigment of unused coating material and the like and to recover the pigment in a form whereby it is conveniently reused. Accordingly, a particular object of the invention is to provide a procedure for separating pigment from coating compositions, coated paper broke or combinations of broke and waste coating compositions in such manner as to provide for the reuse of fibers and/or the reuse of the pigment itself as a constituent of other coating compositions. The term "paper coating waste" is employed herein and the appended claims to indicate both the coating composition waste material in the wet, unapplied state as well as the dry coating on the paper web.

Figure 2:
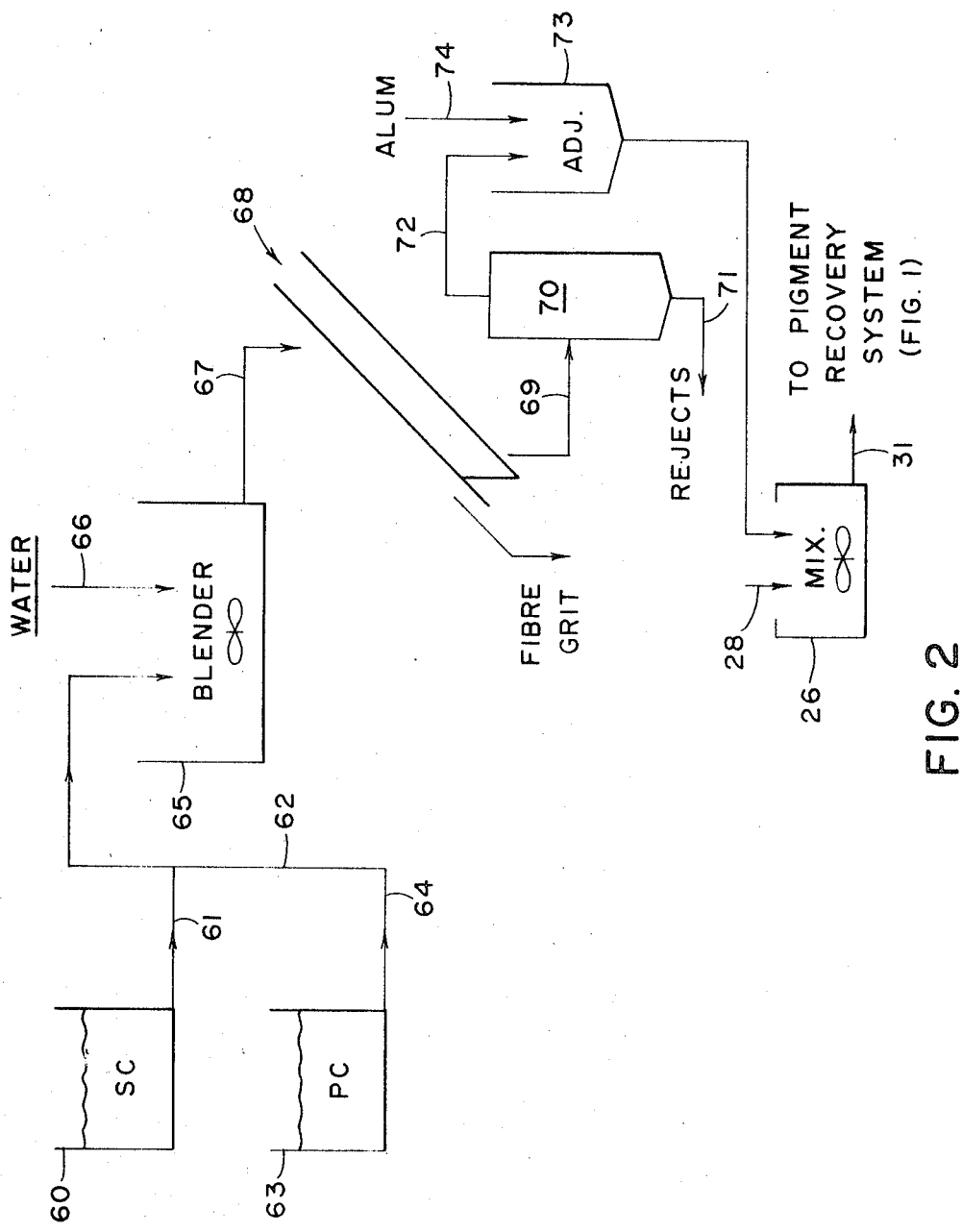

The invention will be more fully understood by reference to the following description and accompanying drawings wherein:

FIG. 1 is a flow diagram illustrating one embodiment of the process of this invention; and FIG. 2 is a diagram similar to that of FIG. 1 and particularly illustrating an embodiment of the process as applied to waste coating compositions.

The equipment arrangements illustrated in FIGS. 1 and 2 are directed to a semi-automatic continuous flow system and, in the specific description which follows, exemplary but non-limiting flow conditions are indicated where appropriate.

PAPER BROKE TREATMENT

Basically in the treatment of broke, the fibers and fines are removed from the repulped broke while the pigment is maintained suspended; then the stability of the starch sol maintaining the pigment suspended is upset by an enzymatic action which hydrolyzes the starch to sugar waters making it treatable for disposal or use and providing for pigment recovery.

As illustrated in FIG. 1, the numeral 1 designates mechanical repulping equipment to which there may be directed through inlet 2 coated paper broke having a starch binder and containing opacifying pigment, as will be noted more particularly hereinafter. Feed line 3 is adapted to provide to the broke repulper 1 a quantity of white water from the usual paper machine recirculation system sufficient in amount that the consistency of the broke in the repulper is about 5 percent. From the repulper which is effective to provide the broke as an aqueous suspension including fibers, fiber fines, pigment and starch sol, the suspension is directed through pipe line 4 to broke chest 5. For some purposes the broke in chest 5 may be diluted to about 2 percent and fed directly to the papermaking machine.

In the instance of this invention, since it is desirable to separate the pigment from the fibers and to recover each, the broke suspension in chest 5 is diluted to about 2 percent consistency and then directed through lines 6,7 under the influence of pump 8 to a side hill screen system generally indicated at 9. The first stage of the side hill screen system, that indicated at 11, is effective to separate a considerable portion of the fiber from the liquid of the system. Thus, screen 11 retains a significant proportion of the longer fibers while the screen 11 effluent indicated at 12 is passed onward for further processing. White water is directed through line 13 to the inlet 14 of the second stage 15 of the screening system. The fibers of the first and second stages at a consistency of about 4½ percent are recovered at 16 and directed to chest storage for reuse in the papermaking operation. The extent of the screening action in a particular recovery operation determines the fiber quality and, in practice, it is preferred to employ a multi-stage counter current screening system when pigment recovery for reuse in quality coating compositions is desired.

The effluent of the second stage is fed by pump 17 from the second stage effluent zone 18 through line 19 to line 6 for dilution of the broke suspension and recirculation through the screening system; such aids the removal of the longer fibers substantially completely from the suspension. The consistency of the dispersion directed through the line 19 is about 0.2 percent.

The screen effluent of the first stage of the screening system is in the form of a milky slurry and is fed through line 20 to a fiber fines settling tank 21. The screen effluent of this first stage screen 11 includes fiber fines, pigment and a starch sol suitably at a consistency of about 0.7 percent. The fiber fines of this screen effluent tend to settle slowly but, I have found, much more rapidly than the dispersed pigment. A centrifugal classification system may be employed for this fiber fines separation if desired. The settlement of fines in the system described, however, occurs very nearly completely over a 2-hour period and centrifugal classification is not necessary to adequate treatment generally. These fines, carrying some pigment with them, at a consistency of about 2 percent, are recirculated by pump 22 through line 23 to the first stage 11 of the side hill screen system 9. There the fines tend to be retained with the centrifugal longer fibers on the screens and the pigment tends to pass with the effluent of the first screen.

The supernatant of settler tank 21 contains primarily pigment well dispersed in the starch sol. The weight of pigment relative to starch in this system is commonly quite high, at least about 1:1, and usually about 5:1, though it may frequently be as high as 8:1. The consistency of the pigment-containing supernatant is about 0.5 percent solids. This supernatant, if not at approximately a neutral pH, is preferably brought to neutrality by the addition of acid through line 24 and the dispersion is directed by pump 25 to hydrolysis tank 26 through line 27; in some instances the pH of the supernatant may be on the acid side, and caustic soda would be added to bring the pH to about 7.0. An amylolytic or starch hydrolyzing enzyme is then fed through inlet conduit 28 to the dispersion in tank 26, usually in an amount sufficient to provide 20–40 parts by weight of enzyme per million of dispersion. The enzymatic process is suitably effected to the extent that some sugars form and generally the exact conditions will be determined by the enzyme selected for use and the time period permissible for enzymatic action in the light of other process conditions. In order to permit effective use of the enzyme, a series of hydrolysis tanks 29,30 interconnected by lines 31,32 are suitably employed, and mild agitation of the dispersion throughout the retention period is effected. The retention tanks, as shown in FIG. 1, are two in number, that is, 29 and 30, although mixing tank 26 serves the same effect and, in some instances, a greater number of tanks may be desired to promote the enzymatic action. A retention period of 1 to 3 hours is effective generally.

The outflow of tank 30 is supplied through line 33 with preferably iron-free alum and the treated slurry is directed by pump 34 through line 35 to a settling tank 36. Additional alum and also a quantity of sodium aluminate in solution may be added to the settler tank 36 through lines 37,38 respectively for purposes of aiding pigment floc development in the tank 36 as noted hereinafter. Commonly, I prefer to add 200 to 350 parts of alum salts per 5,000 parts of initial total solids in the ratio of about 6 parts of papermaker's alum to about 4 parts of sodium aluminate to influence rapid settling of the pigment without pH change.

The flocculation treatment exerted on the hydrolyzed starch slurry is effective to cause settlement of the pigments within about 5 minutes to the extent that the supernatant is only, at most, slightly cloudy in contrast to the milky white initial slurry; the hydrolyzing reaction is not commonly, and need not be, complete, and this will be indicated by the intense blue color which the supernatant may give when tested by reaction with a dilute iodine solution. In the absence of the enzyme and flocculation treatments, the pigment would remain largely suspended in the sol for 2 to 3 days.

The term "sugar water" is employed in this specification and the appended claims to indicate an aqueous fraction containing largely soluble starch degradation products resulting from complete or partial hydrolysis of starch. Such "sugar water" may contain sugars, dextrins, and other partially depolymerized fragments of the original starch polysaccharide.

A common convenient qualitative test for the presence of starch and dextrins consists of the blue colored complex formed by reaction with dilute iodine solution. It has been observed that a starch sol/pigment dispersion undergoing hydrolysis will lose most of its pigment suspending ability long before it loses the ability to form the blue colored iodine complex. To accomplish flocculation and sedimentation of the pigment in an acceptable manner, it is only necessary to accomplish partial hydrolysis of the starch. For practical commercial application the starch hydrolysis step may thus be performed to only partial completion and in such case the "sugar water" effluent will contain some products of more complexity than simple sugars.

In tank 36 settling of the pigments occurs, and the sludge, at a consistency of about 2 percent, is pumped through line 39 by pump 40 through a heater 41. The heater is suitably effective to raise the temperature of the sludge to about 95° C. The flow from the heater is to sterilizer tank 42 through line 43. Sterilizing tank 42 is adapted to retain the thin sludge for a period of about one-half hour at a temperature of at least about 90° C. in order to inactivate the enzyme. Inactivation of the enzyme is necessary if the pigment is to be reused, as the presence of residual active enzyme in coating material would adversely affect the starch binder, for example. The pigment-containing slurry is fed from the sterilizing tank 42 at a consistency of about 2 percent to storage tank 44. From storage tank 44 the pigment dispersion is directed through strainer 45 to a centrifuge 46. Centrifuge 46 is effective to increase the solids of the pigment-containing slurry to approximately 25 or 30 percent.

The liquid or supernatant material of the centrifuge action is essentially sugar water and is usually a substantially clear solution which is conveniently directed to a secondary treatment system indicated at 47 for reduction of the biological oxygen demand in known manner. Additionally, the supernatant or liquid effluent of the pigment settling tank 37 is conveniently directed through line 48 to the secondary treatment system 47. Accordingly, no significant pollution load need be placed on any natural stream when the system of the present invention is utilized.

The aqueous pigment slurry output of the centrifuge may be directed through line 49 to mixing equipment generally designated at 50 for remixing of the slurry with other usual components of a coating composition to provide a coating composition as indicated at 51. The necessary feed lines generally indicated at 52,53 for the other coating components may be readily provided as indicated.

The separation is thus readily achieved and, while it is contemplated that the sugar waters may be treated and passed to disposal, it is considered that such, depending upon particular economic conditions, may be employed as a useful intermediate in the production of yeast, alcohols, etc.

WASTE COATING COMPOSITION TREATMENT

For the purposes of recovering pigment from coatings, waste material which may include unwanted solids such as hardened particles, grit and the like, the procedure of FIG. 2 may be followed. Such waste coating materials may include a variety of different basic types of aqueous paper coatings as long as the preponderant binder material is starch. For example, it has been found that minor proportions of other typical coating binders (such as protein, styrene butadiene latex, urea-formaldehyde resin, polyvinyl alcohol, carboxy methocellulose, and glyoxal) may be accommodated without noticeable ill effect on the recovery of the opacifying pigment. As illustrated in FIG. 2, waste coating material having starch as a binder and retained at a source 60 conveniently designated by the letters SC may be fed through line 61 and blended in header 62 with other coating materials; for example, the source 63 may have a protein containing binder coating composition conveniently designated PC which is directed through line 64 to the header 62 for blending with the starch-containing coating in blender 65. Additionally, in order to attain a convenient workable aqueous system, water may be directed to the blending tank 65 through line 66. Suitably, the consistency in tank 65 is about 0.5–1.0 percent total solids. In order to remove any fiber, grit or other pigment-contaminating materials contained in the mixed dispersions, the diluted coating compositions may be directed through line 67 to a side hill screen generally indicated at 68. The screen is effective to remove coarse particulate material which may be directed to disposal or to other recovery systems as desired. The accepted liquid slurry output of the side hill screen 68 is fed through line 69 to a centrifugal classifier 70. The rejects of the centrifugal classifier are passed out through line 71 while a lighter material, that is, a dilute slurry in the form of pigment dispersed in a starch sol, is directed through line 72 to an adjustment tank 73 for adjustment of pH of the dispersion. This adjustment may be made with acid or alum fed through line 74. Commonly, the adjustment is made to provide the pH of the sol at about 7.0. The effluent of tank 73 may then be directed to the separation system of FIG. 1 at tank 26, enzyme being fed to the starch sol dispersion through line 28 as illustrated in FIG. 1. The legend "To Pigment Recovery System" in FIG. 2 indicates the same recovery system as described in connection with FIG. 1.

The following examples illustrate the utility of the procedures described.

EXAMPLE 1

By way of example of the procedure coated paper broke was treated in the laboratory in accordance with the principles set out in connection with the system of FIG. 1. The base sheet of the coated broke consisted in parts by weight of 20 percent bleached sulfite, 30 percent bleached kraft and 50 percent bleached groundwood. This base sheet had been coated on both sides with a coating composition having approximately the following constituents:

|  | Parts by Weight |
|---|---|
| Clay (papermaker's coating clay) | 85 |
| Calcium carbonate | 15 |
| Starch - modified | 14.5 |

The calculated ash factor of the pigment based on the 85:15 ratio of clay to calcium carbonate is 0.81. This ash factor is related to the purity of the pigments and the ash factor of the recovered pigments relative to the initial ash factor indicates relative purity of the recovered pigments.

The sheet had an overall finished coated basis weight per ream (25 inches×38 inches×500 sheets) of 45 pounds. The coating weight per side was about 6.25 pounds. 2000 grams (oven dry basis) of the coated broke paper were repulped in a small laboratory Morden slush-maker at 30° C. for 5 minutes at a pH of 7.0, at a consistency of about 5 percent. Any significant cutting of long fibers was avoided by backing off the refining rotor. At the end of the repulping treatment the stock was removed from the Morden and diluted to a consistency of about 2 percent. To accomplish partial separation of the fiber fraction the suspension (T=33° C.) was fed in this instance to a single stage side hill screen (80 mesh wire); this resulted in a fiber fraction retained on the screen at a consistency of between about 4–6 percent. The fiber retained on the screen may be rediluted and recycled over several screens so as to materially eliminate pigment and reduce the ash content if desired.

The effluent from the screen was at a pH of 7.0 and temperature of 31° C. Total evaporated solids of the effluent tested 0.80 grams per 100 milliliters. The screen effluent was a dilute suspension of fibrous fines, pigment particles, and binder material. The screen effluent was now subjected to a gravity settling operation for about one hour. The fibrous fines associated or "loaded" with some of the pigment particles settled out quite readily in a gravity settling system. At this time the sediment contained substantially all of the fibrous fines of the effluent from the screen as well as some pigment. Such a settled fibrous fines fraction is preferably recycled to the feed to the side hill screen to accomplish recovery of substantially all fibers and to enhance the extent of pigment separation.

The supernatant of the settling operation contained primarily pigment in a starch sol in a ratio by weight of pigment to starch of about 5:1 at a pH of about 7.0 and a temperature of about 30° C. The supernatant is now subjected to an enzyme treatment using a starch hydrolyzing enzyme. In this instance Amizyme TX–8, a liquid concentrate supplied by Premier Malt Products, Milwaukee, Wisconsin, was utilized to the extent of 30 p.p.m. on the weight of the supernatant slurry. Prior to the addition of the enzyme, the pH was adjusted to provide the pH at about 7.0. At this stage the suspension was milky in appearance. The suspension was maintained at 30° C. while gently agitating for a period of about 4 hours. In the latter stages of the time period alum salts as flocculation agents to the extent of 300 p.p.m. were added to the suspension to accomplish flocculation of the pigment. After the flocculation agent addition, the suspension was then allowed to settle.

The quantity of alum added is related very generally to the concentration of the initial solids. Suitably, a combination of papermaker's alum (hydrated aluminum sulfate) and sodium aluminate provide the flocculation agent. It has been found that the amount of alum salts that should be added for complete flocculation is in direct proportion to the amount of solids present in the dispersion entering settler 39, i.e., at 0.5 percent total solids 300 p.p.m. of alum salts are required; at 1.0 percent total solids about 600 p.p.m. of alum salts are required, etc. A deficiency of alum salts will result in incomplete flocculation of the pigment, yield a supernatant with residual cloudiness, and result in less efficient pigment recovery. Before alum addition in the present instance, the suspension was about as cloudy as milk and had a Jackson turbidity value above 8000 units; after alum salt addition and after allowing to settle for about 5 minutes, a sample of the supernatant has a Jackson turbidity value of about 50 units and cloudiness had practically disappeared.

I prefer to add the sodium aluminate and alum flocculent mix rather than alum alone, particularly where calcium carbonate is present in the dispersion as the mix tends to maintain pH at about 7.0 and formation of calcium sulfate and liberation of carbon dioxide are avoided.

The pigment, contaminated with small amounts of enzyme, dextrins, sugars, alum floc and other salts settled out as a sludge, leaving primarily in soluble form in the supernatant aqueous phase the major fraction of the dextrins and sugars. The supernatant aqueous phase resulting from this settling action is subject, if desired and in known manner, to a secondary treatment by conventional practices for reduction of biological oxygen demand and subsequent disposal.

The sludge settlement resulting from the enzymatic treatment was allowed to settle over night, providing a settled pigment fraction having total evaporated solids test of 3.9 percent, and an ash test of 77.1 percent which indicated a pigment purity of 95.2 percent. The precipitate was washed (three times) to remove solubles and the pigment allowed to settle after each washing. The washing removed soluble impurities from the sludge. A final evaporated total solids test on the slurry of 9.1 percent at an ash test of 80.3 percent was attained, indicating a pigment purity of 99.1 percent. This slurry was then thickened to a consistency of 50 percent total solids by weight by filtering. This recovered pigment material in the form of cakes of about 50 percent consistency is blended with virgin clay for use in the coating composition.

The pigment recovered exhibited a brightness of about 85 G.E., substantially equivalent to that of the original clay. The pigment composition is particularly grit free because of the levigation treatment occurring in the fiber fines settler and is a substitute to a limited extent on a pound for pound basis for virgin clay, particularly as a component of a first or underlying coat in a multi-coat system.

EXAMPLE 2

This example illustrates the application of the process to coated paper broke in an instance where the broke contains as binding agent for the pigments both proteinaceous and starch constituents. In the present instance the paper broke had two superposed coats, an underlying coat having a starch binder, and a top coat with protein binder. Basically, the procedure is as in Example 1 except that the broke, immediately following repulping, is given a treatment with a proteolytic enzyme for the purpose of solubilizing hardened proteinaceous coating flakes so that such flakes can be eliminated from both the recovered fiber fraction and the recovered pigment fraction.

In specific application coated paper broke having a finished basis weight of about 80 pounds ream (25 inches×38 inches×500 sheets) is subjected to my procedure for separate fiber and pigment recovery. In this instance the paper base was 100 percent bleached kraft and double coated, the undercoat contained starch as a binder to the extent of 28 parts by weight per 100 parts of pigment (clay 51, calcium carbonate 40 and titanium dioxide 9); the top coat contained about 11.5 percent protein binder per 100 parts by weight of pigments (clay 34, calcium carbonate 25, titanium dioxide 6, and a hydrated aluminum oxide 35).

The broke, after repulping in the laboratory Morden slushmaker and before screening, is treated with mild agitation at a temperature of about 45°–50° C. and at a pH of about 7.0 with 0.5 percent by weight on the air dry weight of the broke with a proteolytic enzyme (Serizyme, a proteolytic enzyme preparation manufactured by the Wallerstein Company, Inc.). The specific enzyme treatment is disclosed in my U.S. Pat. No. 3,047,452 issued July 31, 1962 and assigned to the same assignee as the present invention; the treatment serves to soften up and disintegrate hardened particles of protein bonded coating; hydrolysis of the protein occurs in the disintegration procedure. The hydrolyzed protein, together with the fibers, fiber fines, pigment and starch sol, are sequentially subjected to screening, settling, hydrolyzing of the starch and then pigment separation and purification as described in Example 1; the hydrolyzed protein passes through the system primarily as a solubilized material and is removable from the system largely with the sugar waters.

EXAMPLE 3

As indicated in FIG. 2 of the drawings and as already generally discussed, the procedure of the invention is applicable to the recovery of pigment or pigments in admixture from waste coating compositions. Further, the procedure is applicable to mixtures of waste coating compositions of various types substantially avoiding any necessity for segregation of such wastes in the paper mill.

In specific application, a composition containing 100 parts by weight of pigment (clay, TiO$_2$ and calcium carbonate) and about 20 parts by weight of binder was processed. The binder on a dry basis included 15 parts by weight of starch, about 4 parts by weight of protein and about 1 part by weight of styrene butadiene latex. The mixture of coating compositions as indicated in connection with FIG. 2 is first diluted to about 0.5-2.0 percent total solids, then screened to remove grit, fiber or the like, cleaned of sand or fine scale particles in the centricleaner, and then in the form of a milky white suspension subjected to the starch hydrolyzing treatment at a pH of about 7.0. The proteinaceous material is colloidally dispersed or in somewhat soluble condition as the material is directed to and through the amylolytic enzyme treatment. The proteinaceous material precipitates during alum treatment and passes with the pigment, being largely adsorbed thereon. Such is not harmful to the pigment which otherwise has characteristics as described in connection with Example 1.

If desired, the pigment slurry, suitably before thickening, is treated with a proteolytic enzyme to solubilize the remaining proteinaceous materials and to provide the pigments substantially free of protein as in Examples 1 and 2.

EXAMPLE 4

Example 3 is repeated except that the waste coating composition in dilute state is subjected to the action of a proteolytic enzyme prior to treatment with the amylolytic enzyme. The protein is thereby hydrolyzed and is not precipitated by the alum addition but passes through the system with the solubles.

Example 5

Example 4 is repeated except the waste coating composition in the dilute state is simultaneously treated with the proteolytic and amylolytic enzymes; the results are as in Example 4.

The procedure of the invention is further flexible in that it permits the mixing in the paper mill of broke and coating composition wastes of various types at one collection point and then separation and recovery in accord with the foregoing principles.

It is to be noted that the general application of the principles set out hereinbefore results in a significant economic benefit by recovery of materials, particularly fiber and pigments; further, the usual pigments such as titanium dioxide, clay and calcium carbonate respond to the treatments of the invention substantially in the same way and are recoverable in about the same proportion as their existence in the broke or waste coating compositions. An important benefit, however, is that the recovery provides largely for elimination of disposal requirements and is a distinct aid in the overcoming of possible pollutions.

Within the specification and claims it will be understood that the following terms have the following general meanings:
 flocculate — to aggregate into small lumps and form a minute floc mass by the aggregation of a number of fine suspended particles;
 sol — a liquid colloidal suspension, that is, a fluid mixture of a colloid and liquid.

The Jackson turbidity value is an empirical measure of turbidity, the value being higher for dispersions of greater turbidity — see ASTM designation D1889-66. Waters of a turbidity of 1000 Jackson turbidity units are considered to be of high turbidity.

In summary and based on the preceding specific examples particularly, it is clear that, if protein may be tolerated in the recovered pigment or if no protein is present in the broke or waste coatings, then only an amylolytic enzyme treatment is required; in this instance the pigment containing slurries derived from the broke in accordance with Example 1 or the waste coating in accordance with Example 3 may be combined in tank 26.

If protein is present in either the broke material or the waste coating and protein is not wanted in the recovered pigment, then the protein containing broke or waste coatings should be treated with a proteolytic enzyme prior to pigment flocculation for such hydrolyzed proteinaceous material will not be precipitated by alum and will pass with the solubles through the system.

Thus, the system has a very definite flexibility in that it may be readily utilized to treat starch-containing materials whether the starch is the sole binder or is combined with other binder materials such as protein and whether in the form of broke or in the form of an undried coating composition; further, the actions on the different materials may be effected singly or simultaneously.

The extent of the starch hydrolysis reaction is not critical to the pigment settlement. A greater or more extended hydrolytic action tends to cause more complete settling of the pigments, with minimized quantity of alum salt addition to accomplish flocculation. It has been found that the settling is not dependent upon complete hydrolysis of the starch but completeness provides a more clear supernatant with less alum salts.

As many apparently widely different embodiments of this invention may be made without departing from the spirit and scope thereof, it is to be understood that I do not limit myself to the specific embodiments thereof except as defined in the appended claims.

I claim:

1. In the treatment of paper coating wastes containing an opacifying pigment and having starch as a binder constituent, the process which includes dispersing the paper coating waste in an aqueous system to the extent that the pigment is provided with any fibers of the waste in suspension in a starch sol, removing fibers and potential pigment contaminating materials from the suspension while leaving the pigment dispersed in the starch sol, subsequently hydrolyzing the starch of the sol to soluble starch degradation products to provide for flocculation of the pigment, flocculating the pigment and separating the pigment floc from the starch degradation products, and inactivating any residual enzyme in the separated pigment floc to provide the pigment for reuse in starch binder coating compositions.

2. The process according to claim 1 in which the ratio of pigment to starch in the starch sol by weight is between about 1:1 and 8:1.

3. In the treatment of aqueous paper coating composition waste containing an opacifying pigment, having starch as a binder and containing dispersed proteinaceous material, the process which includes dispersing the paper coating waste in an aqueous system to the extent that the pigment with fibers of the waste is provided in suspension in a starch sol containing the proteinaceous material in the dispersed condition and subsequently removing the fibers from the sol and hydrolyzing the starch of the sol to sugars to provide for ready flocculation of the pigment in the sugar waters, and adding to the sugar waters alum to precipitate the pigment and insolubilize the proteinaceous material so that it precipitates with the pigment, and separating in a slurry form the pigment and proteinaceous material together from the sugar waters.

4. In the treatment of paper coating waste containing cellulosic fibers, an opacifying pigment and starch as a binder constituent for the pigment and fibers, the process which includes repulping and diluting the waste to a dilute aqueous slurry condition in which the pigment is dispersed in a starch sol containing the fibers, screening out fibers from the sol to provide a sol containing fiber fines, opacifying pigment and starch, classifying the sol to separate out the fiber fines in an aqueous slurry while the pigment is suspended in the sol, hydrolyzing the starch by amylolytic enzyme addition to the sol to provide sugar-containing waters from which the pigment is precipitatable, precipitating the pigment from the sugar-containing waters by addition of a flocculent to the sugar waters, and separating the pigment from the sugar-containing waters.

5. In the treatment of paper coating wastes containing an opacifying paper coating pigment and having starch as a binder constituent, the process which includes dispersing the paper coating waste in an aqueous system so that the pigment is provided in suspension in a starch sol, removing pigment-contaminating materials from the starch sol while the pigment is maintained suspended, then successively hydrolyzing the starch of the sol to soluble starch degradation products and floccing the pigment, and separating the pigment from the degradation products in solution.

6. In the treatment of paper coating waste containing an opacifying pigment, having starch as a binder constituent and including water-insoluble proteinaceous matter, the process which includes solubilizing the proteinaceous material by subjecting the paper coating waste in an aqueous system to the action of a proteolytic enzyme, forming a starch sol with the pigment and fibers of the waste dispersed in the sol, removing pigment contaminating materials from the sol while the pigment is maintained suspended, hydrolyzing the starch of the sol to sugars to provide for flocculation of the pigment in the sugar waters, flocculating the pigment while the proteinaceous material is soluble and separating the pigment floc from the sugar waters and solubilized proteinaceous material.

7. The process according to claim 6 in which the proteinaceous material is solubilized prior to and independently of the starch hydrolyzing procedure.

8. The process according to claim 6 in which the proteinaceous material is solubilized simultaneously with the starch hydrolyzing procedure.

* * * * *